Jan. 20, 1953     J. H. ANDERSON     2,626,006

LIQUID-GAS SEPARATOR

Filed Oct. 11, 1949

INVENTOR
JAMES H. ANDERSON
BY
HIS ATTORNEY.

Patented Jan. 20, 1953

2,626,006

UNITED STATES PATENT OFFICE 2,626,006

LIQUID-GAS SEPARATOR

James H. Anderson, Easton, Pa., assignor to Ingersoll-Rand Company, New York, N. Y., a corporation of New Jersey Application October 11, 1949, Serial No. 120,659

8 Claims. (Cl. 183—2.7)

This invention relates to liquid-gas separators, and more particularly to a system for separating a liquid from a gas where the liquid and gas mixture is under pressure.

A method commonly used for separating a liquid from a gas is to conduct the mixture to a tank wherein the drainage of liquid therefrom is controlled by means of a float valve. One disadvantage associated with this method is that when the mixture is placed under extremely high pressures, the density of the gas will approach the density of the liquid and under these circumstances the operation of the float valve is unstable and erratic.

It is, accordingly, one object of this invention to separate a liquid from a gas by controlling the flow of liquid from a pressure tank, containing a mixture of liquid and gas, in response to changes in pressure of a relatively minute quantity of gas escaping through the liquid outlet.

Another object of this invention is to permit the flow of liquid and to restrict the flow of gas from the pressure tank into a receptacle in accordance with changes of gas pressure within the receptacle.

A further object of this invention is to control the flow of liquid from the aforesaid receptacle in accordance with the liquid level therein.

Figure 1:
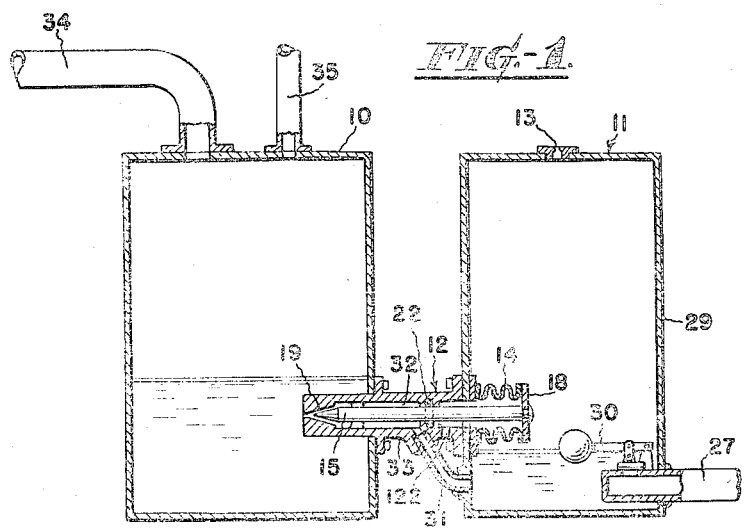
Figure 2:
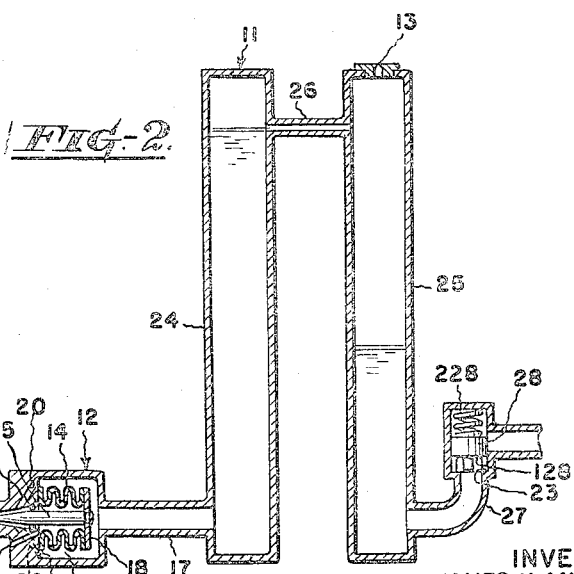

Other objects will become apparent in the following specification and accompanying drawings in which, Figure 1 is a view, partly in section, of a form of the liquid-gas separator, and Figure 2 is a sectional view of a modified form of the separator.

Referring to the drawings and more particularly to Figure 2, a preferred form of the separator is shown comprising, in general, a high pressure tank 10 communicated with a vented receptacle 11 through a valve unit 12 for controlling the flow of fluid therebetween. A liquid and gas mixture, under pressure, is initially drained into the tank 10 from whence the liquid and the relatively small amount of gas flows through the unit 12 into the low pressure container or receptacle 11.

The flow of fluid from the tank 10 into the receptacle 11 is, in this form of the invention, controlled by valve unit 12 acting responsively to changes in pressure in the receptacle 11. These changes in pressure are due to the expansion of gas escaping from the tank 10 into the receptacle 11 thereby causing a pressure rise therein which actuates the valve unit 12 to close off communication between the tank and the receptacle to prevent further escape of gas from the tank; thereafter gas escaping through an orifice, or restricted vent, 13 in the top of the receptacle 11 permits the pressure therein to return to its normal value, in this instance atmospheric pressure, so that the valve unit again establishes communication between the receptacle and the tank.

In this manner liquid is permitted to flow freely through the valve unit 12 whereas the escape of a small quantity of gas through the unit 12 causes a rise in pressure in the receptacle thereby cutting off the flow of fluid through the valve unit in the manner aforesaid. In other words, the flow of liquid only through the valve unit is permitted whereas the flow of a mixture of liquid and gas or gas only is restricted.

Referring in greater detail to the construction of the valve unit 12 in Fig. 2, it is illustrated as a conventional bellows-operated type control valve mounted in a conduit 17 connecting the lower portions of the tank 10 and the receptacle 11, and includes a bellows 14 adapted to actuate a needle valve 15. The bellows 14 encircles the valve 15 and is sealed at one end to a transverse wall 16 in the conduit 17 and the other end of the bellows 14 seats in a sealing relation against a plate or washer 18 secured to the back end of the needle valve 15. The opposite or tapered end of the valve 15 controls the flow of fluid through a conical valve seat 19 formed in the wall 16 and defining a coaxial section of the conduit 17.

At the downstream end of the valve seat 19, an O-ring 22, or similar sealing member, encircles the valve 15 to prevent the flow of liquid into the interior of the bellows 14. Any fluid which may escape into the bellows 14 is drained therefrom through an atmospheric port 122 in the wall 16. The port 122 so positioned also permits air to pass freely into and out of the bellows for ease in operation thereof.

Formed within the wall 16 are a plurality of passages 20 which open at one end into the periphery of the valve seat 19; and the other ends of these passages 20 open into an enlarged portion of the conduit 17 encasing and forming a chamber 21 for the bellows 14. Thus, fluid flowing from the tank 10 through the conduit 17 enters the valve unit 12 through the open or upstream end of the valve seat 19 and is conducted—whenever the valve 15 is unseated—along the passage defined by the valve seat 19 and thence it enters the bellows chamber 21 through the passages 20, and from the chamber 21 the fluid passes into the receptacle 11. Whenever the valve 15 is urged onto its seat 19, in response to an increase in pressure in the receptacle 11, the tapered end of the valve 15 seals the upstream ends of the passages 20 thereby cutting off communication between the tanks 10 and 11.

The receptacle 11, in the form of the invention illustrated by Figure 2, comprises a pair of vertical tanks, or standpipes, 24 and 25. Fluid enters the standpipe 24 through the conduit 17 connected to the lower portion thereof and passes from the standpipe 24 into the standpipe 25 through a pipe 26 connected between the upper portion thereof. The fluid circuit through the receptacle 11 is completed by the outlet conduit 27 connected in the lower portion of the tank 25. It is to be noted here that by virtue of this construction—a vertical standpipe 25 having its inlet 26 located at the upper end and its outlet 27 at the lower end thereof—any possibility of the orifice 13 becoming clogged by oil due to the foaming of the oil in the receptacle 11 is eliminated.

Positioned within the conduit 27 is a spring-pressed relief valve 28 which is actuated in response to changes in pressure within the tank 25 to control the flow of fluid therefrom. These changes in pressure within the tank 25 result, of course, from the expansion of gas in the tank 25 (causing a pressure rise) and the escape of gas therefrom through the vent, or orifice, 13 positioned in the top of the tank 25 (causing a pressure drop). The changes in liquid level in the tank 25 also cause a change in the pressure of the fluid acting on the valve 28.

The valve 8 may be of any conventional design and is shown, for sake of example, as comprising a spring-actuated plunger type valve 28 positioned at an elbow of the conduit 27. The valve, or plunger, 28 is urged against a stop, or shoulder, 23 formed in the conduit 27, by a spring 228 interposed between the downstream end of the valve 28 and the wall of the conduit 27. In this valve position, flow through the conduit 27 is blocked. The plunger 28 is urged into the open position by fluid pressure acting on a pressure surface 128 on the upstream end of the plunger 28.

The form of the liquid-gas separator shown in Figure 1 is similar in many respects to the form of the separator shown in Figure 2 except the receptacle shown in Figure 1 takes the form of a single low pressure tank 29 in which is located a conventional float valve 30 for controlling the flow of liquid from the low pressure tank 29 through the conduit 27. Communication is established between the high and low pressure tanks 10 and 29, respectively, through the valve unit 12; or more particularly, this communication is established through the passage 32 defined by the valve housing 33 and a pipe 31 opening at one end into the passage 32 at a point between the seat 19 and the O-ring 22, and connected at the other end to the lower portion of the tank 29.

In this form of the invention, the forward, or upstream, end of the valve unit 12 extends into and is communicated with the high pressure tank 10, whereas the rearward end of the valve 15 extends into the low pressure tank 29 and accordingly the bellows 14 is housed within the tank 29. In this particular instance the float valve 30 is positioned below (as viewed in Figure 1) the bellows 14 so that the valve 30 will open to permit the flow of liquid from the tank 29 before the liquid level reaches the bellows 14.

It is to be understood that the particular form of the valve means 12 used to control the flow of fluid between the high pressure tank or the receptacle, or low pressure container, is not restricted to the form of the valve shown by the way of example. The valve means 12 shown in Figure 1 can be used equally as well in the separator shown in Figure 2; and the valve unit shown in Figure 2 can be used satisfactorily in the separator illustrated in Figure 1. The type of valve used is, of course, dependent to the particular fluid system to which the separator is adapted. For example, under one set of circumstances, it may be desirable to have the high and low pressure tanks immediately adjacent to each other, in which case a valve means 12 similar to that shown in Figure 1 would be utilized. Under another set of circumstances it may be desirable to have the low pressure tank situated at some distance from the high pressure tank in which case a valve similar to that shown in Figure 2 would be preferable.

Briefly reviewing the operation of separator, and first the form of the separator shown in Figure 2, it will be assumed that an oil and gas mixture under a pressure of 400 p. s. i. (pounds per square inch) is conducted to the high pressure tank 10. Immediately some of the gas will pass from the tank 10 through the valve means 12 and into the tanks 24 and 25 causing the pressure to rise therein. This rise in pressure acting on the plate 18 will overcome the force exerted in the opposite direction by the bellows 14—the bellows 14 are designed to urge the valve 15 off its seat 19—to close the valve 15 thereby halting the flow of fluid into the tank 24. The valve 15 will remain closed until such time as the pressure within the tank 24 falls—due to the escape of gas through the orifice 13—below a value sufficient to overcome the pressure exerted by the compressed bellows 14. In this instance, this pressure value will be slightly greater, say for example 5 p. s. i., than the liquid head between the conduits 17 and 26, or, in other words, when the pressure exerted on the plate 18 approaches the value of the pressure which would be exerted on the plate 18 if the tank 24 were filled with oil up to the conduit 26, the valve 15 will open.

Inasmuch as the flow of gas through the orifice 13 is restricted, a short time interval will lapse before the pressure in the tank 25 falls below a value at which the valve 15 will open. During this time interval, the pressure tank 10 will become partially filled with oil so that when the valve 15 again opens, only oil will be conducted from the tank 10 to the standpipe or tank 24. When the oil level in the tank 24 reaches the conduit 26, oil is then conducted into the tank 25 which will fill to some predetermined level at which the liquid head will be sufficient to operate the relief valve 28 to drain the oil from the tank 25 through the conduit 27. In the event that the flow of oil through the conduit 17 should exceed the rate of flow of oil into the pressure tank 10, the oil level within the tank 10 will, of course, fall below the open end of the conduit 17 and the gas under pressure will flow into the tank 24 and in the manner previously described increase the pressure within the tank to a value which will operate the valve 15.

By the proper choice of the unit 12 and the size of the orifice 13, the quantity of gas escaping from the tank 10 can be limited to a negligible amount and the valve 15 will, whenever a small quantity of gas escapes therethrough from the tank 10, close to restrict this flow. Or, if it is preferable, by the proper choice of the aforesaid elements 12 and 13, the separator can be made to operate in such a manner that a small quantity of gas will pass continuously through the valve means 12 and out the orifice 13 thereby maintaining a continuous flow of liquid from the tank 10 to the receptacle 11 instead of the intermittent flow previously discussed.

The operation of the modified form of the invention shown in Figure 1 is quite similar to the operation of the separator shown in Figure 2 with the exception that the flow of liquid from the tank 29 is controlled by means of the float valve 30 and the valve 15 is subjected only to gas under pressure in the tank 29 and operated thereby. It is, of course, not essential that the liquid level within the tank 29 be maintained below the bellows 14. The gas under pressure within the tank 10 will return through the conduit 34 connected to the upper portion of the tank 10 for conveying the mixture under pressure to the tank 10, or if desired, a separate gas outlet 35 may be connected to the top of the tank 10.

It is apparent from the foregoing discussion that a fluid-gas separator constructed in accordance with the practice of this invention is capable of accomplishing, among others, the objects hereinbefore stated and is, moreover, capable, due to its simplicity, of design, of operating effectively over a wide range of pressures to separate a liquid from a gas in a mixture under pressure.

While I have shown and described specific forms of my invention, it is to be understood that various changes and modifications may be made without departing from the spirit of the invention as set forth in the appended claims.

I claim:

1. A liquid-gas separator comprising, a high pressure tank having an inlet for receiving a mixture of liquid and gas under pressure, a low pressure receptacle having an outlet, a conduit connected between and communicating the lower portions of said tank and receptacle, a valve in said conduit for controlling the flow of fluid therethrough and having a pressure surface thereon exposed only to the pressure of fluid in the receptacle for urging the valve into the closed position, a restricted gas vent in the upper portion of said receptacle to permit the escape of gas therefrom for varying the pressure of fluid in the receptacle, and a valve in said outlet for controlling the flow of fluid therethrough.

2. A liquid-gas separator comprising, a tank having an inlet for a liquid and gas mixture under pressure and having a gas outlet, a second tank having a restricted gas vent at the upper end thereof, means for communicating said tanks, a valve in said means exposed to and actuated by gas pressure in the second said tank for permitting the flow of liquid into the second said tank and restricting the flow of gas thereinto, an outlet for the second said tank, and a valve actuated by liquid in the second said tank for controlling the flow of liquid therefrom through the last said outlet.

3. A liquid-gas separator comprising, a tank for receiving a liquid and gas mixture under pressure, an inlet for the tank for such mixture, a pair of standpipes, means for intercommunicating the upper end portions of said pipes, means for communicating the lower portion of one of said pipes with the tank, a restricted gas vent in one of said pipes, a valve in the second said means for restricting the flow of fluids therethrough in response to variations in pressure in the first said pipe, an outlet for the second said pipe, and a relief valve for controlling the flow of liquid through said outlet.

4. A liquid-gas separator comprising, a tank having an inlet for liquid and gas under pressure, a receptacle, means for communicating the receptacle with said tank to permit the flow of fluid therebetween, a restricted gas vent in the receptacle to permit the escape of gas therefrom to vary the pressure in said receptacle, a liquid outlet for the receptacle, a valve for controlling flow through the outlet in response to variations in the level of liquid in the receptacle, and means responsive to changes in pressure in the receptacle for restricting the flow of fluid through the first said means into said receptacle.

5. A liquid-gas separator comprising, a tank, an inlet for the tank to conduct a liquid and gas mixture under pressure thereto, a receptacle having a restricted gas vent therein, means for communicating the receptacle with said tank, valve means responsive to changes in pressure in said receptacle for permitting the flow of liquid only and restricting the flow of a mixture of liquid and gas from the tank to said receptacle through the first said means, an outlet for the receptacle, and a valve for controlling the flow of liquid through said outlet.

6. A liquid-gas separator comprising, a high pressure tank, a conduit for conveying a mixture of liquid and gas under pressure to said tank, a low pressure receptacle, an outlet for the receptacle, means for communicating the tank with said receptacle, a restricted gas vent in the receptacle to permit the escape of gas therefrom for varying the pressure in the receptacle, a valve acting responsively to such variations in pressure in the receptacle for controlling the flow of fluid through said means, and a valve to control liquid flow through said outlet for draining liquid from the receptacle in accordance with the liquid level therein.

7. A liquid-gas separator comprising, a pressure containing tank, an inlet for such tank for liquid and gas under pressure, a receptacle, means for communicating the tank with the receptacle to permit the flow of liquid and gas therebetween, a valve for controlling the flow of fluid through said means and acting responsive to variations in pressure in said receptacle for permitting the flow of liquid only into said receptacle and to restrict the flow of a mixture of liquid and gas into the receptacle, means adapted to the receptacle for permitting restricted escape of gas from the receptacle to vary the pressure therein, a liquid outlet for the receptacle, and a valve for controlling the flow through said outlet in response to variations in liquid level in said receptacle.

8. A liquid-gas separator comprising, a tank having an opening therein for receiving a liquid and gas mixture under pressure, a receptacle having a restricted gas vent therein, means for communicating the receptacle with said tank for conducting liquid and gas therebetween, a valve for controlling flow through said means and having a pressure surface thereon exposed to pressure downstream of said valve for actuating said valve in response to variations in such pressure to permit the flow of liquid and restrict the flow of gas through said means, an outlet for the receptacle to permit the escape of liquid therefrom, and a valve for controlling the flow of liquid through said outlet.

JAMES H. ANDERSON.

REFERENCES CITED

The following references are of record in the file of this patent:

UNITED STATES PATENTS

| Number | Name | Date |
|---|---|---|
| 1,173,518 | Hoxsie | Feb. 29, 1916 |
| 2,348,357 | Parks | May 9, 1944 |